United States Patent
Meaney et al.

(10) Patent No.: US 9,355,107 B2
(45) Date of Patent: May 31, 2016

(54) CRIME INVESTIGATION SYSTEM (71) Applicant: 3rd Forensic Limited

(72) Inventors: Patrick Meaney, Berkshire (GB); David Mcintosh, Hampshire (GB); Daniel Jimenez, Malaga (ES)

(73) Assignee: 3rd Forensic Limited (GB)

( * ) Notice: Subject to any disclaimer, the term of this patent is extended or adjusted under 35 U.S.C. 154(b) by 188 days.

(21) Appl. No.: 14/045,651

(22) Filed: Oct. 3, 2013

(65) Prior Publication Data

US 2014/0040309 A1 Feb. 6, 2014

Related U.S. Application Data (63) Continuation-in-part of application No. 13/866,508, filed on Apr. 19, 2013, now abandoned.

(30) Foreign Application Priority Data

Apr. 20, 2012 (GB) .................................. 1206974.6

(51) Int. Cl.
*G06F 17/30* (2006.01)
*G06Q 50/18* (2012.01)
*G06Q 50/26* (2012.01)
*G06F 21/62* (2013.01)

(52) U.S. Cl.
CPC ...... *G06F 17/30106* (2013.01); *G06F 21/6245* (2013.01); *G06Q 50/18* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 2004/0117638 A1* | 6/2004 | Monroe | 713/186 |
| 2004/0225681 A1* | 11/2004 | Chaney et al. | 707/104.1 |
| 2006/0018520 A1* | 1/2006 | Holloran | 382/116 |
| 2007/0094324 A1* | 4/2007 | Vata | 709/203 |
| 2008/0008348 A1* | 1/2008 | Metois et al. | 382/100 |
| 2011/0018998 A1* | 1/2011 | Guzik | 348/143 |
| 2011/0026781 A1* | 2/2011 | Osadchy et al. | 382/118 |
| 2011/0292037 A1* | 12/2011 | Lu | 345/419 |
| 2011/0313893 A1* | 12/2011 | Weik, III | 705/28 |
| 2012/0192239 A1* | 7/2012 | Harwell et al. | 725/109 |

OTHER PUBLICATIONS

International Search Report, PCT/GB2013/051018.

* cited by examiner

*Primary Examiner* — Wilson Lee
(74) *Attorney, Agent, or Firm* — Lerner, David, Littenberg, Krumholz & Mentlik, LLP (57) ABSTRACT

A computer-implemented crime investigation system having a computer including a processor is operable to: receive and store one or more image data items, each of which shows one or more offenders in the process of committing an offence; authenticate a user belonging to a first access group; receive, via an application interface, case information from said user; attach portions of said case information, as indicated by said user using said application interface, to one or more of said image data items, as also indicated by said user using said application interface; search at least one of: said image data items or said case information based on search parameters; and return one or more search result image data items, having at least one of image data or attached case information which matches said search parameters, together with any of said case information attached to said search result image data items.

18 Claims, 7 Drawing Sheets

CRIME INVESTIGATION SYSTEM

CROSS-REFERENCE TO RELATED APPLICATIONS

The present application is a continuation-in-part of U.S. patent application Ser. No. 13/866,508, filed Apr. 19, 2013 which claims priority from United Kingdom Patent Application No. 1206974.6 filed Apr. 20, 2012 the disclosures of which are hereby incorporated herein by reference.

TECHNICAL FIELD AND BACKGROUND OF THE INVENTION

1. Field of the Invention

The present invention relates generally to the field of crime investigation and specifically to crime investigation using image evidence, and in specific examples, to a point of investigation tool and interface, wherein the tool and interface are operable for entering, accessing and updating case, crime scene and image information in or near real time and from the field.

2. Background of the Invention

Currently there are very limited resources available to law enforcement agencies in terms of computerized systems. The Applicant considers that such limited resources constitute a significant barrier to effective analysis of criminal intelligence information. Many police forces can now measure the number of finger prints and DNA samples gathered, the number that have led to an suspect/offender been identified and the number that resulted in an suspect/offender been brought to justice. The same may not be true for suspects/offenders seen in crime images (such as CCTV images), where no other forensic evidence is available, such as DNA and/or Finger prints. Police forces often do not know how many images they are in possession of, not to mention the physical location of such images; typically they will be stored in filing cabinets, desks drawers and other isolated silos, thus being used inefficiently or not used at all.

SUMMARY OF THE INVENTION

An object of the present invention is to provide a crime investigation tool for tracking case suspects/offenders status and image evidence to solve and link crimes where visual evidence of the suspect/offender exist.

Therefore, in accordance with a first aspect of the present invention there is provided a computer-implemented crime investigation system, comprising a computer including a processor. The computer can be operable to: receive and store one or more image data items, each of which shows one or more offenders in the process of committing an offence; authenticate a user belonging to a first access group; receive, via an application interface, case information from said user; attach portions of said case information, as indicated by said user using said application interface, to one or more of said image data items, as also indicated by said user using said application interface; search at least one of: said image data items or said case information based on search parameters; and return one or more search result image data items, having at least one of image data or attached case information which matches said search parameters, together with any of said case information attached to said search result image data items.

As used herein, a statement referring to "attaching", "attachment of" or "an attached" portion of case information to other data such as one or more image data items shall mean associating the portion of case information with the one or more image data items in one or more databases such that a computer-implemented search of the one or more databases returns information matching a search parameter, the matching information including either case information, one or more image data items associated with the case information, or both case information and the one or more associated image data items.

As used herein, "computer" and "computer including a processor" shall mean one or more computers each having at least one processor, whether any such one or more computers are general purpose computers which are programmed to perform certain functions or operations, and whether any such one or more computers are specific purpose computers having one or more hard-wired or hard-coded functions. Such one or more computers can have a variety of forms such as a user computer, e.g., desktop, laptop, or mobile computer such as smartphone, among others, or server computer, network or cloud computer, among others, or a computer or processor embedded in a more specific device, such as a device for recording and processing one or more of images, sound, e.g., voice, or text. A statement that a system includes a computer including a processor is operable to perform a particular function shall mean that the one or more computers is operable to perform the particular function, either alone, or as performed partly by one or more of the computers and performed partly by one or more other computers of the one or more computers. In one example described in the following disclosure, there is provided a crime investigation tool for entering, accessing and searching Image information and related information to aid in investigations and solve crime. Further, there may be provided a remote interface in communication with a crime investigation tool adapted to store case related and Image information, permit searching through stored records, link matching profiles and generate reports all in or near real time. Furthermore, there may be provided a secured-access investigation tool in communication with intelligence labs and law enforcement officials, where the tool is capable of evidence chain of custody tracking, among other functions.

In another example described in the following disclosure, there is provided an investigation tool utilizing image (still and video) evidence including a database for receiving case related information, organizing the information, storing the information, running queries, finding matches, and generating communications and reports.

The investigation tool may be in communication with an on-site or remote interface operable for accessing the investigation tool, inputting information, performing searches and receiving reports, automatically or upon request from a user. The interface may be used in the field to enter case-related information, introduce image evidence for Image analysis and comparison, track case status, and receive matching image reports, among other reports, in or near real time.

In another example described in the following disclosure, there is provided, the point of investigation tool includes a database including a memory, processor, software, server and interface for receiving, storing, sorting and communicating information. The information includes crime details with at least one of crime number, crime location, suspect/offender image, modus operando, crime type, suspect/offender description, motivation, suspect/offender associates, among others. The investigation tool provides real time or near real time access and updating, and is capable of generating and outputting "match" and "no match results," among other results, automatically and upon demand.

In yet another example described in the following disclosure, there is provided an investigation method whereby a user of the method, such as a law enforcement officer, is provided with an interface for accessing and entering information into an investigation tool, originating a case, entering specific information related to the case and collection circumstances, tracking case history, viewing image profile matches, receiving reports and case updates, and tracking evidence chain of custody, among other functions. In a specific example, image profiles are matched with identification information are disconnected from the personal information.

DETAILED DESCRIPTION OF THE INVENTION

The present invention will now be described more fully hereinafter with reference to the accompanying drawings, in which.

The following detailed description discusses several exemplary embodiments of the invention; however, the invention may be embodied in many different forms and should not be construed as limited to the representative embodiments set forth herein. The exemplary embodiments are provided so that this disclosure will be both thorough and complete, and will fully convey the scope of the invention.

Figure 1:
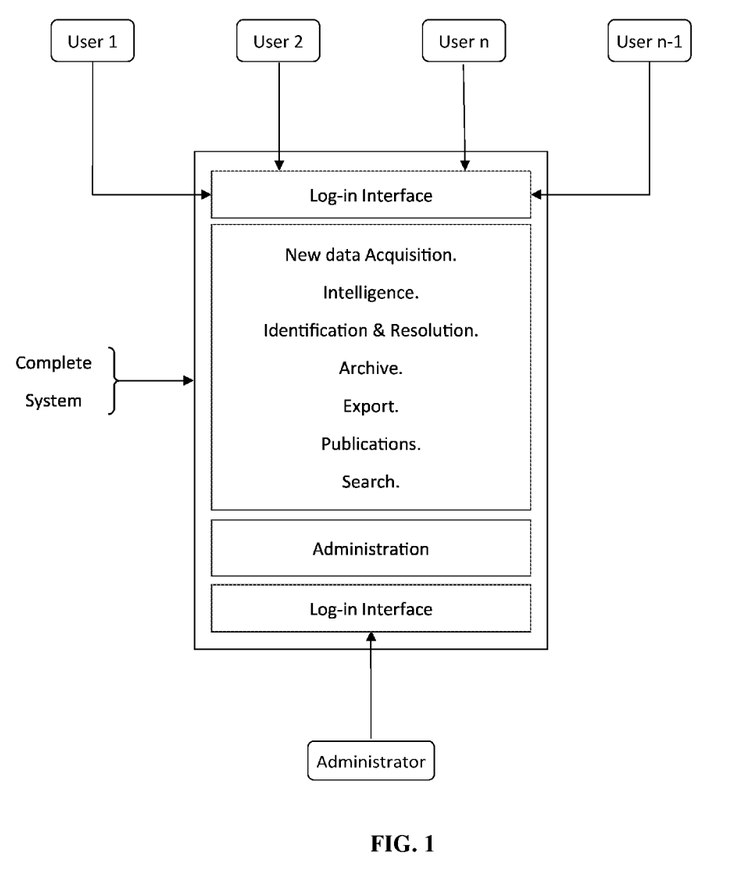
FIG. 1 illustrates a criminal intelligence system according to an embodiment of the present invention.

The system of FIG. 1 allows access to users (both normal application users and application administrators). It is envisaged that application administrators may be given privileged access to certain portions of the system, such as an application setup portion as shown in FIG. 1, as well as to the day-to-day administrative tasks associated with running of a database software application, whereas normal application users may be restricted to access to only an information entry/retrieval portion. Both application user and application administrator access is controlled through log-in interfaces. These may be the same or different, so as to optionally provide greater security for application administrator-level access. The application users may also be segregated in to "User Roles" further allowing the division and classification of the data available to each "User Role" as well as the areas within the application interface to which the "User Role" can gain access to.

Further, each user of the system may be associated with one or more groups (i.e. "User Roles"). Each of these groups, as mentioned above, may have an associated set of access rights and privileges. The specific access rights that may be associated with a group will be discussed in further detail below.

As part of the Setup process completed by the application administrator, she/he will define groups (i.e. "User Roles") each group defined by the application administrator may have access to specific areas and the data contained within these areas of the application. For example, the application administrator may create but not limited to the following as seen in Table 1 below

TABLE 1

Data Entry Role, which would only allow the application user to enter data, but not view existing records. This may be further restricted to specific areas within the system, so that an application user belonging to this "User Role" may, for example, only have access to the "New Data Acquisition" area of the system via the application interface.
Data Update Role, which would only allow the application user to modify existing data, but not create new records. This may also be combined with restrictions on the areas of the application interface where this user can and cannot complete Data Updates.
Data View/Reader Role, which would only allow the application user to view/read exiting data, but not create or modify records. This may also be combined with restrictions on the areas of the application interface where this user can and cannot view/read data.
Supervisory Role, which may only allow the application user to approve exiting records at determine point within the system, so that these records can continue to traverse the overall process. This may also be combined with restrictions on the areas of the application interface where this user can and cannot supervise data.
Publication Role, which may only allow the application user to generate publications as defined in the system.
Export Role, which may only allow the application user to export data to XML format files.
Search Role, which may only allow the application user to complete manual searches for specific data within the system via the application interface.

As mentioned above these are only examples of potential "User Roles" which could be based on legislative requirements due to data protection or privacy laws, or may be based on data classification by the entity running the application. In summary the system provides the mechanism by which to enforce any procedure necessary to protect the data stored in the system database and ensuring that only those application users with the correct security clearance can gain access to the data in a manner authorized and in accordance with the law or the company's data policy.

As is shown in FIG. 2 to FIG. 7, the system may be considered to be divided into ten areas as seen in Table 2 below:

TABLE 2

1. Access,
2. Application Setup (Administration),
3. New Data Acquisition,
4. Intelligence,
5. Identification Resolution,
6. Archive,
7. Export,
8. Publication,
9. Search,
10. Statistics.

Each of these areas of the system of FIG. 1 will now be discussed in turn in further detail.

It should be appreciated that a portion of the system may be provided on individual client computers within an organization, with a further portion being provided on one or more server computers. In addition, the records for the system may be stored on the one or more servers.

Access—User Login

Figure 2:
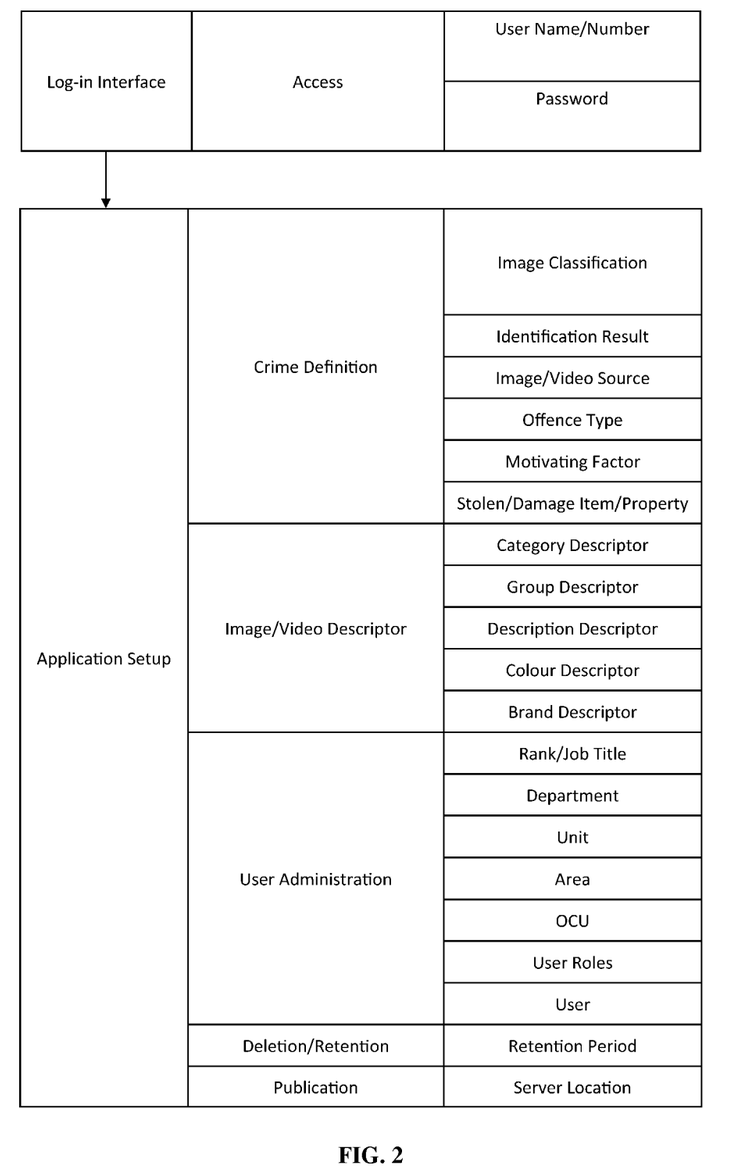
FIG. 2 displays in more detail the Application setup area within the system of FIG. 1.

As shown in FIG. 1, all users may be required to log-in to gain access to the system, regardless of the "User Role" and the activity they intend to conduct. FIG. 2 illustrates in more detail the access process whereby the system requests the user to provide their user-name and password.

If the user name/number is correct but the password does not match, it may allow a total of, for example, three attempts before locking the account. Once this takes place the client application administrator is notified automatically. Only she/he can unlock the account.

If the user number entered does not exist, the application may allow the user to register and may request further information to complete the registration. Once more it may notify the client application administrator automatically of the request for access. The further information required to complete the registration may include the following as seen in Table 3 below:

TABLE 3

User Name/Number,
a. Password,
b. Name,
c. Surname,
d. Mobile Number,
e. Land Line Number,
f. Email,
g. Rank/Job Title,
h. Department,
i. Area,
j. Unit,
k. Employee number and/or badge number If the correct user name/number and password is entered, the user may be provided with access based on the user role to which he/she belongs as assigned by the application administrator at registration time.

The user access can also be controlled by work schedules i.e. a user may only be allowed on the system from Monday to Friday between 08:30 and 17:00, as defined by the application administrator at registration time.

The user access can also be controlled by their geographical location or entry point, i.e. a user may only be allowed on the system if they are on a specific PC with a specific IP Address or MAC Address, or some other variation such as within a specific domain, etc., as defined by the application administrator at registration time.

The last two points, 4 and 5 may be combined to create further complexity, i.e., a user may only be allowed within a predefined schedule from a predefine location. However multiple schedule/locations may be defined for any individual user and/or group of users, and/or user belonging to a "User Role", etc.

Finally it is also important to note that the application may be setup to make use of any existing SSO (Single Sign-On) system the client/customer may have, ignoring the building access control if so desired by the client/customer.

Application Setup (Administration)

As part of the application administration process, there is an Application Setup component, as shown in FIG. 2. This may assist an administrator in management of the system on the day-to-day tasks as well as in the initial setup and launch process.

More particularly, an administrator may configure the system so that it complies with the business rules for the organization in question. These business rules may include the legislative environment within which the organization operates, so that the application complies with local laws, and also internal organization rules, so that the application complies with the established processes specific to the organization.

As shown in more detail in FIG. 2, the management area within the system may allow the client application administrator to define components specific to the client's environment, which are later used by the application users in the day to day activities. These components may, for example, include the following as seen in Table 4 below:

TABLE 4

1. Crime Definition:
Offence type - for example, theft, burglary, assault, murder, or other (allow free-text input by the user)
Offender Image Classification(s) - for example, Unidentified, Identified unconfirmed, Identified confirmed, Image for Comparison, Custody Image . . . or other (allow free-text input by the user)
Identification Result(s) - the outcome of the identification, for example: charged, warned. Cautioned . . . or other (allow free-text input by the user)
Image/Video Source(s) - the type of device that provided the image, for example: CCTV, Cellular-Phone, Photographic or Head Camera, or other (allow free-text input by the user)
Motivating factor(s) - for example, alcohol, drugs, racial, homophobic, or other (allow free-text input by the user) and
Stolen/Damaged property(s) - the type of property that was stolen and/or damaged during the incident. For example, the stolen item in question, car, handbag, laptop, or other, in the case of property damage it may be a window or a Bus or a Shop front, or a vehicle, or other (allow free-text input by the user)

2. Image/Video Descriptor these components provide pre-set fields to describe a suspect/offender as seen in an image/video. However free text is also allowed. As seen in as seen in Table 5 below, it may include:

TABLE 5

Category Descriptor - for example: Clothing, Hair, Accessories, or other (allow free-text input by the user); and
Group Descriptor - for example, within the Clothing category, the following groups be included: Upper Clothing, Lower Clothing, Footwear, or other (allow free-text input by the user); and Description Descriptor (which may further define the selection in Group Descriptor) - for example within the Clothing category and Upper Clothing Group, we may find, Long Coat, Overcoat, Casual Jacket, Hooded Top, or other (allow free-text input by the user); and
Brand Descriptor - for example, Nike, Puma, Adidas, Asics or other (allow free-text input by the user); and
Color Descriptor - for example White, Blue, Black, Yellow, or other (allow free-text input by the user); and
Unique Descriptor - in this area of the application interface the application user may make use of free text to describe unique features of the suspect/offender which do not fall within any of the above Descriptors and which would help in the identification of the suspect/offender. This might, for example include such details as disabilities (e.g. if the offender uses a wheelchair), or many others.

The system may restrict use of the Brand and Color descriptors discussed above based on the use of the Category, Group and Description Descriptors. Thus, if particular Category, Group and/or Description Descriptors are used, the available selection of Brand and Color descriptors may be restricted and/or changed in accordance with the particular Category, Group and/or Description Descriptors used. In some cases, no options may be available at all under the some Descriptors, for example the Brand Descriptors.

To give a specific example, if "hair" was chosen as the Category Descriptor, it would not make any sense if the Brand descriptor was also used. Therefore, the choice of Category Descriptor might cause the system to not allow any choice to be made under Brand Descriptor.

Similarly, if "hair" was chosen as the Category Descriptor, the choices available under Color Descriptor may be different than if the Category Descriptor was "clothing". When describing the hairstyle of the suspect/offender, the color descriptors available might be different to the gender of a suspect/offender. These simple common sense rules may be enforced by the system through its application interface.

The rules governing the combination of Category, Group, Description, Brand and Color as mentioned above may be "fine-tuned" by the application administrator during the application setup to further comply with any business process the client may like to further imposed on the application users.

The Image/Video Descriptors described above, may be used by a "video analytics engine" to automatically find suspects/offenders in the system database, i.e. the "video analytics" engine may be provided search parameters such as suspect/offender wearing a yellow t-shirt and a Mexican hat and be asked to search the entire system database to find any matches.

3. User Administration this area of the setup allows for the definition of application users and all the data associated/stored for an application user. For example, as seen in Table 6 below:

TABLE 6

Rank/Job title - in the case of a police force, this could be Police Officers, Researchers, Identifiers, Data Providers, Sergeant, etc., whereas in the case of a casino this could be Security Officer, Table Manager, Croupier, Floor Manager;
Department(s) - in the case of a police force, this could be Auto-Theft, Drug Unit, Terrorism, etc., in the case of a casino this could be Security, Finance, Services etc.;
Unit(s) - in the case of a police force, this could be Special Operational Units, Special Task force Units, etc.) Area(s), this may be either a geographical area or an operational area as defined by the client;
OCU(s) - this is the breakdown of a geographical area or operational areas into smaller groups;
Security Access Group(s)/Level(s) - these are the "User Roles", described above;
User(s) - here the system is making reference to the application users; the data collected on the application user can be as seen in Table 7 below:

TABLE 7

1. User Name/Number,
2. Password,
3. Name,
4. Surname,
5. Mobile Number,
6. Land Line Number,
7. Email,
8. Rank/Job Title,
9. Department,
10. Area,
11. Unit,
12. Employee number and/or badge number.

As previously mentioned, the system may be integrated with the clients existing SSO (Single Sign On) in which case the details mention under the above "User(s)" section would be automatically collected/transferred from the existing clients SSO system to this system for it use.

4. Deletion/Retention Rule

Data Retention rule—this area within the administration of the application, allows the application administrator to define the data retention period according to the business rules for the organization in question. These business rules may include the legislative environment within which the organization operates, so that the application complies with local laws, and also internal organization rules, so that the application complies with the established processes specific to the organization.

For example, where the system is deployed within a Police Force, it may be mandatory (e.g. owing to local laws) that records of a particular nature, such as those associated with a murder, be available and held by the system form 30 years, or theft be available and held for 15 years.

5. Publication

Publications Server location—the system allows for the separation of some of its components, such as the web-interface engine and its publication engine. This area of the application administration allows the application administrator to specify the location of the publication engine if this is remote to the database engine.

In this setup component, the client application administrator is able to create the frame-work of constraints and boundaries within which all application users must work.

This may firstly ensure that entries into the system are consistent, and properly categorized, so as to ensure efficient searching of the records. For example, if a user is given free choice over entering the "offence type", they may mis-spell the type of offence, which may prevent other users from finding that record later. In addition, different users might enter different terms under "offence type" even though the offence is essentially the same in both cases. As a result, a user performing a search later on may find only one, or indeed neither of the two records.

By guiding users to choose from a set of offence types that are set up in advance by an administrator such problems may be ameliorated. For example, in the case of a police force, the administrator may configure the system so as to restrict the options for "Offence Type" to include only those that are currently defined by criminal law as offences. Further, an administrator may update the options to take account of changes in criminal law.

Of course, as noted above, the system may also provide for "free-text" input by the user, where one of the pre-set categories is not appropriate, or even allow for free text to be used on pre-set categories, however the application administrator would have to ensure that searches run phonetic matches thus reducing and/or even eliminating the potential human errors associated to miss-spell entries.

Secondly, this may ensure that the quality of the records on the system meet the minimum standards required by the organization. For example, in the case of a police force unit, the business rules for that unit or force may such that they only consider images obtained from CCTV or Head Cameras worn by police officers to be acceptable. As a result, the system may be configured by the administrator so that only these two types may be selected as the Image Source.

As noted above, this Application Setup process may allow each user to be assigned to one or more Security Access Group(s)/Level(s). Users in a particular Security Access Group may be given specific rights, for example to delete or approve records on the system. Or to enter new data as well as to generate publications, or to enter new data and complete searches or to only view data within specific areas in the system application interface, or other combinations as mention previously in this document.

Once the client application administrator has completed the application setup process, the application itself will enforce the applied business process, constraints, boundaries and rules, as well as make use of these in its automated matching facility, while taking into account all the data entered for each and every offence.

This approach enables the application to be deployed and used by a wide range of organizations operating in completely different fields which by nature would have different and perhaps contradictory business rules and objectives.

New Data Acquisition

Figure 3:
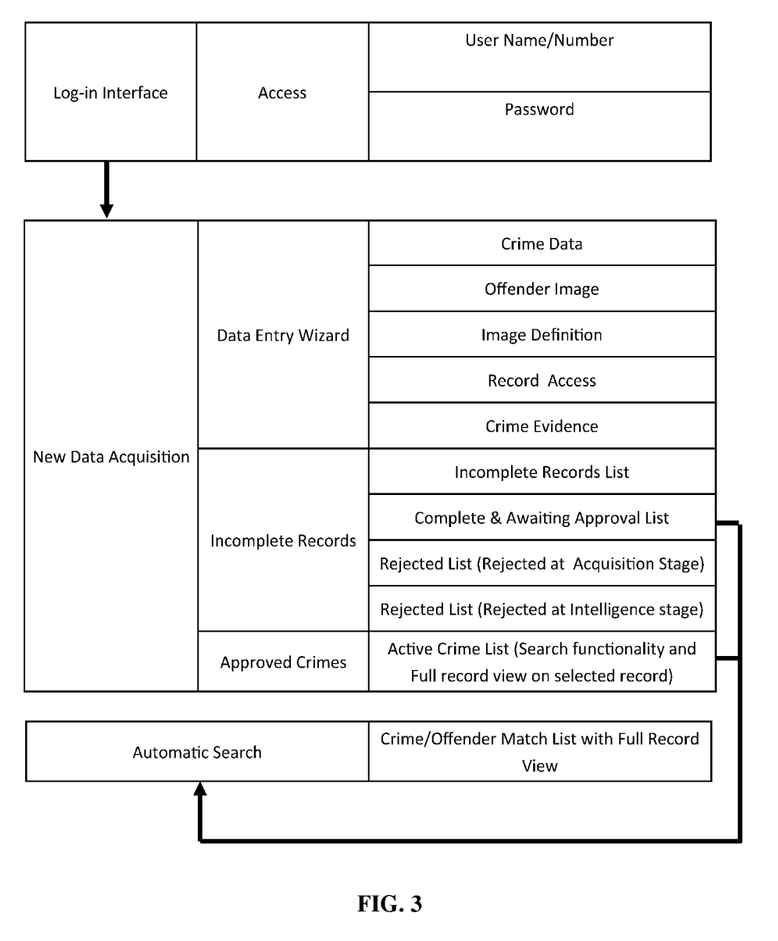
FIG. 3 illustrates the New Data Acquisition area within the system of FIG. 1.

As shown in FIG. 3, New Data Acquisition area of the application allows the application user(s) to define new records via the application interface. This is achieved via a wizard that guides the application user through a number of screens presenting her/him with the relevant forms to fill.

Part of the mentioned new record creation wizard process, is automated to minimized data entry error (for further details of which, please refer to the Automated Data Entry section below), while other aspects may not be. Those components of data entry which are not automated are tightly monitored and control by validation process in the application logic, based on the client's business rule(s).

If at any stage the new data entry was to be interrupted before reaching its completion, the system will store the partial record, allowing the user to return at a later stage to complete the missing sections of the data entry wizard.

To further help the application user in the task of locating an uncompleted record, she/he will be presented via the application interface with a list of records in an uncompleted stage, showing the areas which require her/his attention for completion.

This area of the system interface, the New Data Acquisition, may display a list of uncompleted records as mention above, this list offers the application user a search functionality to further assist her/him to filter and locate specific records which require data prior to the system flagging the record as completed and ready for approval.

As mention above, this New Data Acquisition area of the application interface constitutes the initial point of entry for new data. Here the users, based on the user role to which she/he belongs and the rights that their user role may have, can create a new record, i.e. add a new crime and its associated data to the application database as well as unique identification references to other systems which may exist in the client's digital infrastructure as seen in Table 8 below:

TABLE 8

Add the offender(s) image(s)
Ensure legal and business operational requirements are
met, for example:
Force the application user to provide full
details of a witness, such as personal details,
contact details, statements of the event and/or
approval for the use of the details provided.
Full details of the officer who collected the
crime evidence.
A detail list of all crime evidence collected and
its associated evidence number within the crime.
Full details of the crime location including
geographical demarcations which are specific to
the business such as a branch number when
referring to a bank office for example.
Define the parameters by which this record can be
searched,
Flag the record's access level, i.e. when the new
crime record is not a normal case, it may be
classified under a different access right/privilege.

This New Data Acquisition area of the application interface also contains a list of completed records, which, based on the business rule applied during the Application Setup process may require supervisor signoff, i.e., approval and/or rejection. For example, a supervisor group may be created during Application Setup and all users belonging to this group given permission to approve and/or reject completed records in the New Data Acquisition area.

The rejection of a newly created record may stop the record from moving further in the process by blocking it until further action and/or work has been completed, ensuring it meets the business requirements and rule(s) where necessary. The application user who created the record would be notified so she/he can address the potential issues prior to the record's approval, which will place the record in circulation within the system.

The list of rejected records in the application interface provides the application user with search functionality to further assist with its location as well as modifications for its approval.

It is important to note that the record created in this initial stage can later be modified and/or updated, if required, by a user who has the appropriate access rights/privilege, through the application interface.

The application in turn may only use the new record once it is completed and approved. Such use may include generating intelligence briefs in an automatic process, which may optionally make use of a number of existing records (once the record has been flagged as completed by the system and approved by an application user—this last step is governed by the client's business rules).

During the approval process, the system may, if it finds any matches in the database to the new record, automatically present intelligence briefs on the application interface, including association(s) to other known and/or unknown offenders in other related or unrelated crime records held by the system.

These automated matches may be completed at different levels, for example, as seen in Table 9 below:

TABLE 9

Image definition as described above, i.e. Category
Descriptors, Group Descriptors, Description
Descriptors, Brand Descriptors, Color Descriptors, or
the match may be accomplished by the "video Analytics"
engine based on some search and/or filter criteria as
provided by the application user.
Unique attributes, such as features normally not seen
or defined against a suspect/offender. For example New
Zealand style facial tattoos.
Offender definition, such as Date of Birth, and/or
Name and/or Address, and/or Race and/or Gender and/or
other personal details.
Offence type, as described above.
Offence location,
Offence factor(s), such as drug related and/or alcohol
related, and/or homophobic and/or xenophobic, etc.
Modus Operandi, such as with repeating offenders where
they always follow the same routine. For example, in a
financial fraud crime, the suspect/offender may enter
a bank and seek the assistance of the bank in having
some funds withdrawn from an account she/he claims to
be a close relative who is under hospital care and
which cannot attend the bank to complete the withdraw
of the funds, etc.
Known associates when multiple suspects involved.
Known 2nd and 3rd level associates when multiple
suspects involved.
Links by known and/or unknown suspects/offenders to
other crimes, etc.

TABLE 9-continued

Further details of such automated matches are given
below in the Automated Matches section.

In this "New Data Acquisition" area of the application interface, the application user may also be presented with a list of all the approved and active crimes (i.e. those still the subject of current investigations). As this list could be extensive, the system, via its application interface, provides assistance to the application user by providing a search/filter mechanism that acts on the records for active crimes, based on multiple crime parameters. Suitable parameters for searching active crimes may include various crime data, various unique crime reference numbers, the identity of the crime record creator, etc. Once the record in question is located, the application user will be presented with the complete record as it stands within the system database.

Intelligence

Figure 4:
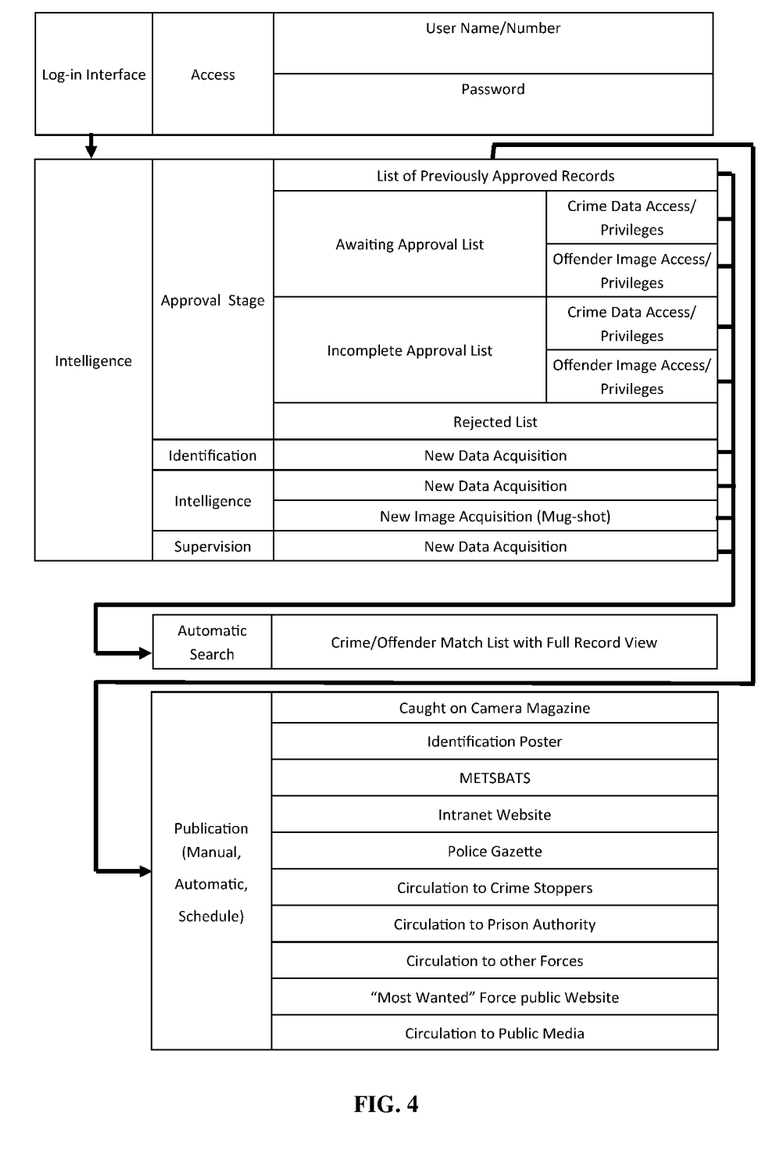
FIG. 4 shows the Intelligence and Publication areas within the system of FIG. 1.

As shown in FIG. 4, in the Intelligence area of the system the application user may (depending on how the system has been configured in Application Setup, which may be informed by the client's business rules) have three distinct areas in the application interface.

Further detailed breakdown of the crime can be provided, thus providing a more granular definition of the crime and its access rights. For example, if multiple offenders are involved in a crime, it may be necessary to restrict the viewing access/privileges on the details associated to a particular offender, as departments within the same organization may already be conducting surveillance on this offender and may not want a petty theft to interfere with a much more important operation.

Depending on how the system was configured in Application Setup, supervisor-level users may at this stage have the ability to either approve or reject the crime record. For example, a supervisor group may be created during Application Setup and all users belonging to this group given permission to approve and/or reject completed records in the Intelligence area. Further, members of this group may be given permission to approve and/or reject completed records in both the New Data Acquisition area and the Intelligence area.

Figure 6:
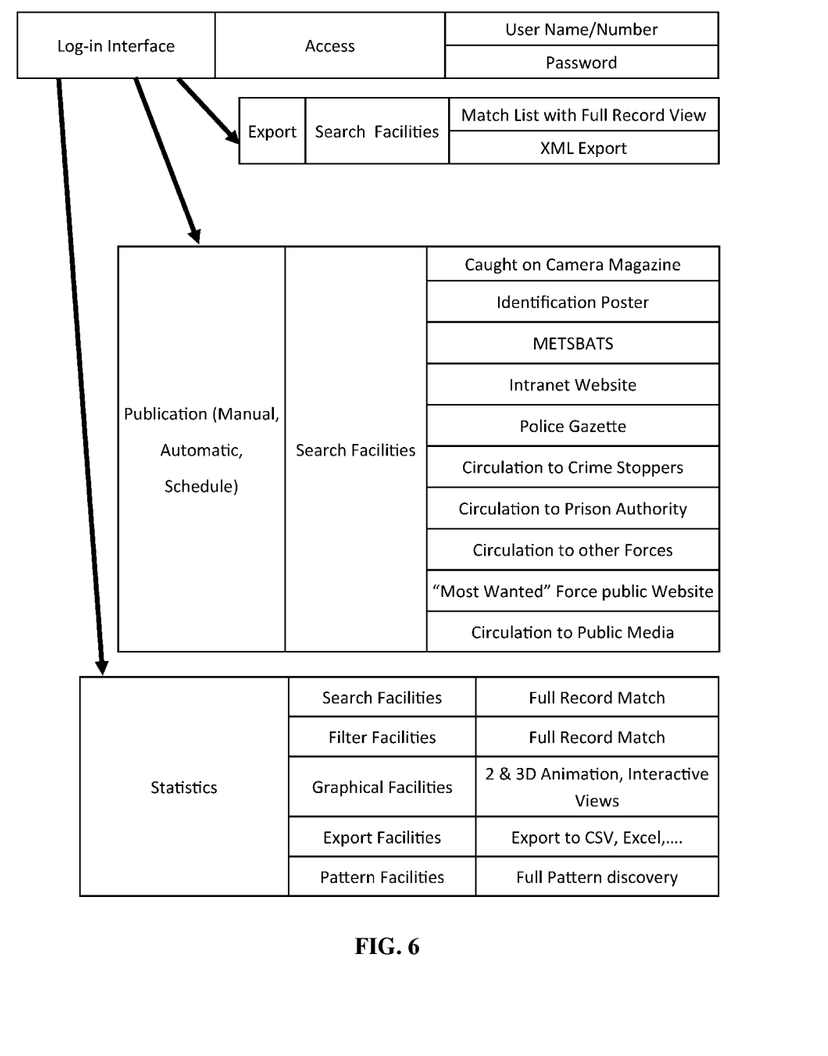
FIG. 6 shows the Statistics area and the Publication area, both within the system of FIG. 1.

Once the record is approved and deemed to comply with the client's business rule, the application user may make use of the publication engine (as shown in FIG. 6) to distribute the crime and/or offenders details. This may be only for internal distribution (i.e. within the client's organization) or it may also include authorized partners, or circulation to the public. Publication might be via email, newsletter or print, or other suitable means of communication, as seen in Table 10 below:

TABLE 10

Caught On Camera magazine,
Identification Poster,
METSBATS (Internal publication(s)),
Police Intranet,
Police Gazette,
Circulation to Crime Stoppers.
Circulation to Prison authorities,
Circulation to other forces,
Displayed on the applications "Most Wanted" public facing web-site(s) component,
Circulation to Public Media (Such as TV, Newspapers, etc.).

If, on the other hand, the record was rejected, the system, via the application interface, may notify the user who originally created the record, bringing to her/his attention the rejection and the required work to be completed prior to the record's approval for its transition through this are of the system.

Offender Identification, Intelligence and Supervision Steps

At this point the application users may use the application system itself, and/or external sources such as a witness, members of the public or other systems within a police force, etc., among others, to help in the identification of offender(s). As shown in FIG. 4, if information is acquired and a possible positive identification of an offender(s) in a crime is generated, from the publications mention above, as an example, or from any other source, the application user will be requested by the system, through its application interface, to complete a form in which full details of the possible positive identification of the offender is recorded, including (but not limited to) any supporting identification documentation, offender details, "Identifier" details, etc. This would automatically trigger the system to request the application user to complete an intelligence report/form via the application interface, which may assist further in the positive identification of the offender. This intelligence report may in addition require the user to complete a number of checks on the possible positive offender identification, as well as to collect further intelligence details to support the possible identification.

Once an Intelligence report/form is completed for an offender, the system will require its approval by an application user with the correct privileges (for example a member of a supervisor group) through the application interface, before notifying the geographically correct local office for further action, and allowing the record to move to the next stage in the system.

This approval process will force the authorized supervisor-level application user to view the entire record as it stands for the potential positive identification of an offender(s), as well as to complete a form where further data is entered on this offender identification, including the reasons why the positive (or indeed negative) decision with regard to identification of a particular offender was made (such reasons may be referred to as "decision points").

Identification & Result

Figure 5:
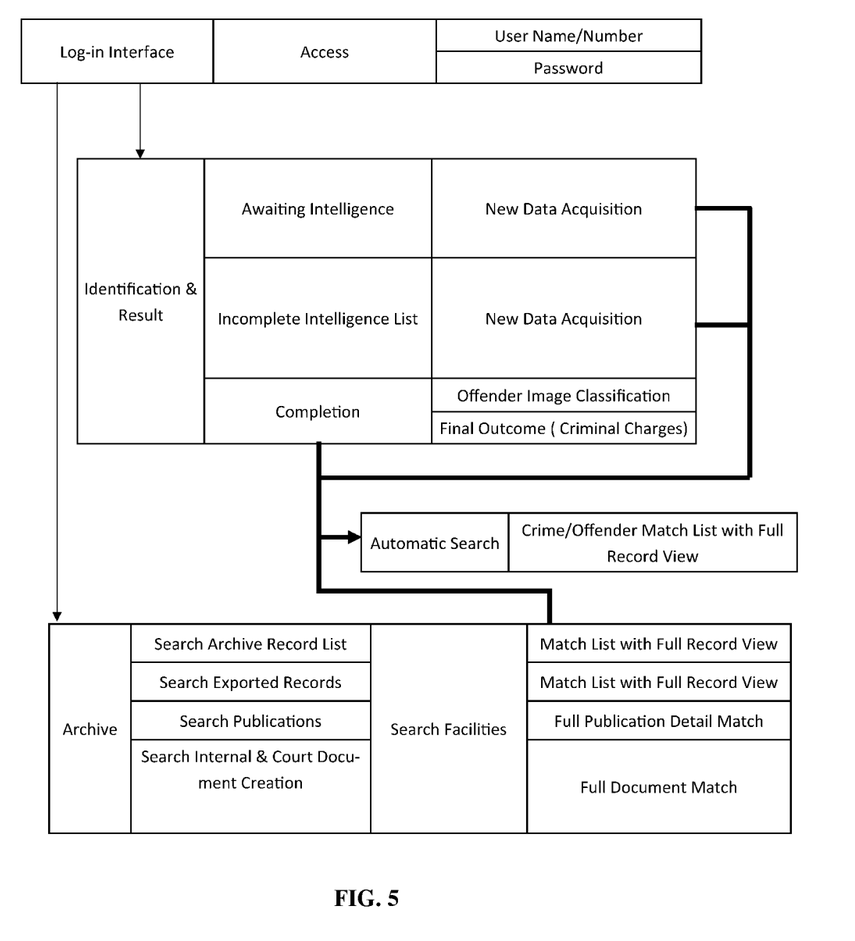
FIG. 5 displays the Identification & Result area and the Archive area, both within the system of FIG. 1.

The Identification & Result area of the system is shown in FIG. 5. In this area of the system, the application user may be notified by the application interface of a possible positive identification of an offender. The system may ensure that the notified application user will be located in the geographically correct local office, based on the reported crime and possible positive offender identification details. For example, if the crime was reported in New York, the system may notify application users based in New York.

The application user located in the geographically correct local office may then be presented via the application interface with all the collected data on the crime and offence including any additional information the system may match on other crimes and/or offender in the system, and related to this crime and offender.

At this stage, the organization may carry out investigations in person, for example carrying out a visit to a suspect/offender's address, carrying out a raid or arresting a suspect for questioning. Such investigations in person may, for example, confirm that the person questioned looks like the suspect/offender in the crime image/video; they may confirm that the suspect/offender has no alibi for the date/time of the offence; equally, they may confirm that the person questioned does not visually resemble the suspect/offender in the crime image/video or that the person does in fact have an alibi for the date/time of the offence.

Part of the presentation on the crime and offender may therefore include an initial form, which the application user based in the local office will have to complete through the application interface, with further details of the suspect/offender based on local "foot work & intelligence", which may include the intelligence gathered during the investigations in person.

Once this initial form with "foot work & intelligence" details is completed, the application user may be presented with a final form in which an identification result of the offender is recorded, as well as the action taken. The final outcome, as recorded in this final form, may be that the user rejects the presented identification of the offender. For example, the suspect/offender, when confronted, may not have any resemblance to the suspect/offender in the crime image/video or the suspect/offender may have been in prison at the time of the offence.

In such a case, the crime and offender remain active, so further identification and intelligence work may be completed with the aim of finding the correct identification. Therefore, the system moves the crime/offender back to the "Intelligence" area of the system as described above, but keeping the incorrect rejected identification as part of the case and viewable through the application interface, so as to avoid unnecessary duplication of efforts later on.

On the other hand, if the identification of the offender is found—as a result of investigations in person—to be correct and this is recorded in the final form, the case is then marked as archive and will be moved by the system to the archive area, thus removing it from the "active crime" area of the application interface.

However, all the details regarding the crime and offender may nonetheless remain available to the application user via the archive area of the application interface and to the system when completing either manual or automatic searches, or match facilities, as well as for Internal Client and Court documentation purposes.

Export

This area of the system, via the application interface, allows the application user to complete a search on active crime(s) and/or offenders based on search criteria and then to select one or more of them to export to an XML file (or other suitable export file format) for distribution. For example, records associated with a particular crime(s), and/or offender(s) may be exported.

It is important to note that only the data which complies with the client's business rule(s) and which was setup during the deployment of the application will be exported. For example, the client's business rule may only allow for the image and crime location to be exported and not any other data held and associated to the crime.

Publication

This area of the system, via the application interface, may allow the application user to create those publications which comply with the client's business rule(s) and where configured during the system setup process.

To complete a publication, the application user would, via the application interface, provide search parameters which would be used to present to the application user a list of crime(s) and/or offenders that match the search criteria. Once the results of the search are presented to the application user, she/he can select which crime(s) and/or offender(s) to include in the publications, preview the publication for approval and finally publish the document as required.

The system may be configured for the use of "Dynamic Publication Templates", or of RTF files, or of any suitable file format.

Search

Figure 7:
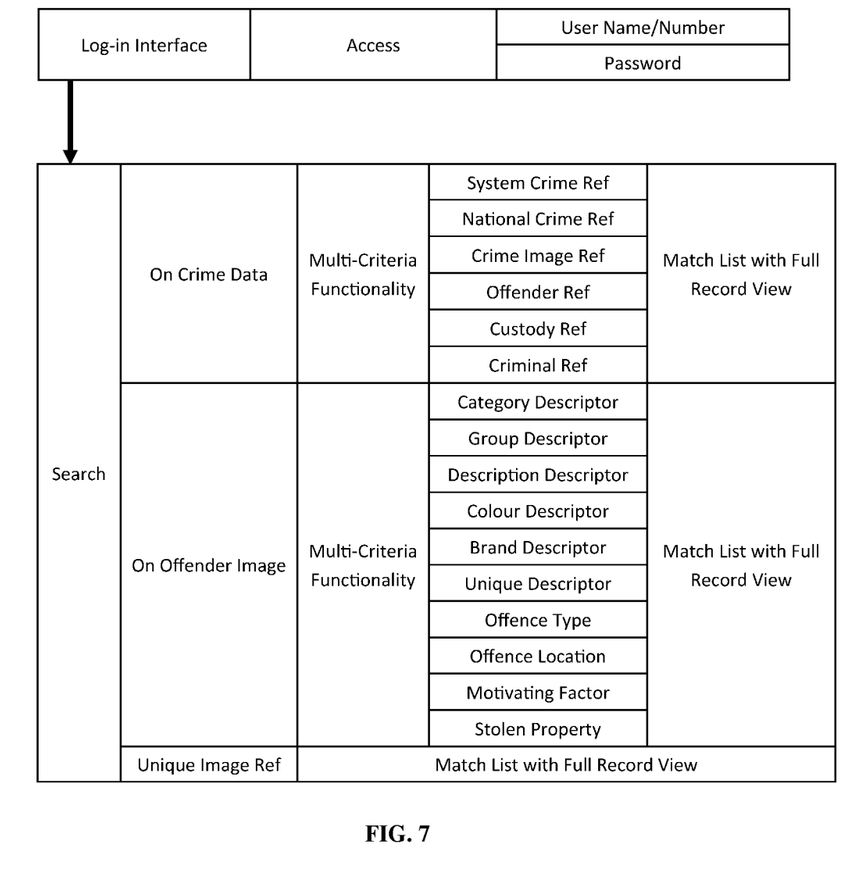
FIG. 7 illustrates the Search Area within the system of FIG. 1.

As shown in FIG. 7, the system also includes a Search area. This area allows the application user, via the application interface to complete a number of different searches, for example: on crime(s) data, and/or on offender(s) image/video, on details of the publication(s) in which images of a specific offender(s) were included.

The search functionality offered by the system to the application user through its application interface will accept search criteria which span across multiple areas. For example:

On the crime data search, the application user may provide such search criteria as: unique system crime record number and/or a national unique crime record number and/or a unique crime image number and/or a unique possible offender identification number and/or a unique custody reference number and/or unique criminal reference number. It will be appreciated that a search on unique reference numbers may return only one match.

On the offender image search, the application user may provide search criteria that relate to the image and to the crime. For example, the user may provide image search criteria including: Category Descriptor, Group Descriptor, Description Descriptor, Primary and/or Secondary Colors associated to the Descriptors along with Manufacture brands and Unique Descriptors; and crime search criteria including: Offence Type, Offence location, Stolen Items, Motivating Factors, and the like. The combination of search criteria from two (or more) different categories may assist the user in identifying relevant image results more quickly, therefore filtering out false positives. Alternatively, or in addition, a "Video Analytics" engine may be provided, which will analyze the stored images/videos themselves, rather than the attached case data. For example, if search parameters such as suspect/offender wearing a yellow t-shirt and a Mexican hat are provided, the system may provide matching images that do not have "Descriptor" details as mentioned above and/or do not have crime data as also mentioned above. Furthermore, a "Facial Recognition" engine may also be used to find suspect/offender matches based on image/video details. In such a case, the "search parameter" may be one or more videos or images of a suspect/offender's face, with the system then returning matches from the stored images where the face in the image is similar. Thus, a "Facial Recognition" search may return images with or without the "Descriptor" details as mentioned above and with or without crime data as also mentioned above.

On the offender image publication search, the application user may provide as a search criterion the unique reference number of the offender image, for example so as to discover the publications in which the image has been published, the date of publication, the type of publication and the application user who included the image in the publication.

The system, as previously mentioned and shown in FIGS. 2 to 5, is capable of completing automated searches in or near real time (as data is acquired and/or updated in most areas of the system. Therefore, "New Data Acquisition", "Intelligence", "Identification & Result" as well as the providing mechanism to complete a manual search on any data combination. Therefore minimizing if not eliminating human error at this level (refer to the Appendix for more details regarding Search).

If the search is completed on crime data and/or offender image, the system, via the application interface, may present to the application user with a copy of all the data related to the crime in question, and in the case of crime searches, it may also present to the application user any potential links to other crimes or offenders it may find to be relevant, including known and unknown associations and associates ("unknown associates" of an offender are other offenders who have not yet been identified, but are known to associate with the offender in question, for example because they appear within images with the offender in question).

Statistics

The application provides both static and dynamic reporting facilities, including statistical reporting facilities. Thus, as shown in FIG. 6, an application user can make use of pre-defined report templates or she/he can create bespoke reports based on intelligence needs. These, like all aspects of the application, are control by a strict security access control system.

The reports may be a pure statistical nature based on the data held within the system database, or it may be on a discovery nature such as the use of data patterns, showing data trends and/or movements, variations from the norm, etc.

The Statistics area of the system may be dictated by the client's business rule(s) and management needs.

Archive

This area of the system via the application interface allows for a number of different searches on different aspects of the system to be completed as seen in Table 11 below:

TABLE 11

Allows the application users to complete searches on crimes and/or offender which are no longer active and have been moved to the archive section. Once the record in question has been located, the application user is presented with a complete copy of the record. The application user may also be presented with matches the system has made, to either previous archive records or newly active crime(s) and/or offender(s).
Allows the application user to complete a search who and when data has been exported via the "Export" facility offered on the user interface. Knowing what, when and who completed the export to XML file of the data stored on the database related to a specific crime and/or offender as set by the business rule(s) and configured during the setup process.
Allows the application user to find who, when and type of publication generated.
Who and when an internal or a court document on a crime, offender or identification was generated.

APPENDIX

The following section sets out details of embodiments of the present invention in still further technical detail.

Automated Data Entry

As part of the application setup process, the client application administrator defines a number of items which will be used by the both the application user and the application itself during normal every day operations. These items will later constitute part but not all of the automated data entry. For example, if we were to look into the application user registration process, we would note that the application administrator during the application setup process defined the following in Table 12:

TABLE 12

Rank/Job Title
Department
Area
Unit

Therefore if this organization was a Casino, the application administrator may have created the options listed in Table 13 below for each of the points mentioned in Table 12, respectively:

TABLE 13

Security Officer, Table Manager, Croupier, Floor Manager,
Security, Finance, Services
VIP Zone, Bank, Roulette, Main Restaurant,
Red unit, Blue unit, Black unit, These, would be the only options available to the client application users when she/he registered as an application user.

Later when the registered application user is completing her/his normal task, the application will automatically add data to the new record, such as the application user details, minimizing human data entry error(s). This is also true when a record is supervised by the data entry superior, as it would be pointless to ask the supervisor to provide her/his on details having just log-into the system to complete her/his duties.

Furthermore, the automated process also checks to verify the validity of the new record. An application user in London say a croupier could not truly claim to have been witness to suspicious behavior by an individual on a table in the casino in Manchester when she/he was working in London!

As a summary, the automated data entry aspect of this application will populate areas of the new record being created and/or updated, with known data, such as but not limited to the details of the application user creating the record. The areas of the new and/or updated record which cannot be automatically populated, will be presented to the application user, when possible, with a list of pre-define options thus minimizing the potential for human data entry error.

Automated Matches

As previously mentioned in the New Data Acquisition section of this document, the application will notify the application user when a match is found by the system. The application administrator can setup the system to conduct automated searches of all existing records on a time interval(s) and/or when a new record(s) is added and/or requested by an application user i.e. on demand.

The application administrator will also define the criteria by which a record is considered to be a match, i.e. 100% match on all search criteria, or a scaling system. For example:

When a new record is added or updated the application will search all existing record to find a match based on the business boundaries rule(s) and search criteria defined by the application administrator, this may extend beyond the system physical boundaries, to include other systems within the client's business infrastructure. Table 14 below provides a sample list of the possible parameters which may/could be used:

TABLE 14

Image definition(s),
Description Category(s),
Description Group(s),
Description Item(s),
Unique attribute(s),
Unique descriptions not covered in any other Image definition area.
Suspect detail(s),
Offence type(s),
Offence location(s), TABLE 14-continued Offence factor(s),
Modus Operandi,
Known associates when multiple suspects involved.
Known 2nd and 3rd level associates when multiple suspects involved.
Previous links between offenders and crimes.
Suspect criminal record details, such as number or other significant detail,
Suspect "Mug-shot".

If the system was to find any records and/or images which match the above defined sample criteria, to that of the newly entered record and/or image, it will bring the matching record and/or image to the attention of the application user.

Search

The automated matches section above has described by use of an example how the application can complete a search on all existing records to find matches to a newly created record(s) or updated record, which previously did not exist.

The Manual Search functionality provided to the application users of this system can be viewed as a subset of this process as only some of the available parameters of the automated match search criteria is used to complete the search in most cases. For example:

Let us say that the application had only defined the following search criteria parameters for the Manual Search facility within the application, as seen in Table 15:

TABLE 15

Image definition(s),
Description Category(s),
Description Group(s),
Description Item(s),
Offence type(s),
Offence location(s),
Offence factor(s), And that the application user chooses to only provide the following data for a manual search of existing records, as seen in Table 16:

TABLE 16

Offence type(s),
Offence location(s)
Offence factor(s)

The system will return a collection of records and/or images where all three, the offence type(s), offence location(s) and offence factor(s) would match, while disregarding the image definition(s) data it had found which may reinforce or disregard the match result to be presented to the user based on the search criteria provided.

A number of embodiments of the invention have been described. Nevertheless, it will be understood that various modifications may be made without departing from the spirit and scope of the invention. Accordingly, other embodiments are within the scope of the following claims.

The invention claimed is:

1. A computer-implemented crime investigation system, comprising:
at least one computer including a processor, said at least one computer operable to:
receive and store one or more image data items, each of which shows one or more suspects in the process of committing a suspected offence;
authenticate a user belonging to a first access group; receive, via an application interface, case information from said user; attach portions of said case information, as indicated by said user using said application interface, to one or more of said image data items, as also indicated by said user using said application interface;
search at least one of: said image data items or said case information based on search parameters; and
return one or more search result image data items, having at least one of image data or attached case information which matches said search parameters, together with any of said case information attached to said search result image data items;
wherein the system is further operable to:
generate publications based on one or more of said image data items selected, via said application interface, by a user;
authenticate a user belonging to a publication approval access group;
update the case information attached to one or more "approved for publication" image data items that are selected by said user belonging to said publication approval access group, via said application interface, from said one or more stored image data items, so as to indicate that the approved image data items and their related case information have been approved for publication by said user belonging to said publication approval access group; and
wherein the system allows the generation of publications based on only image data items that have been approved for publication.

2. A computer-implemented crime investigation system according to claim 1, wherein users belonging to said first access group do not have sufficient access privileges to approve for publication image data items and their related case information.

3. A computer-implemented crime investigation system, comprising:
at least one computer including a processor, said at least one computer operable to:
receive and store one or more image data items, each of which shows one or more suspects in the process of committing a suspected offence;
authenticate a user belonging to a first access group; receive, via an application interface, case information from said user; attach portions of said case information, as indicated by said user using said application interface, to one or more of said image data items, as also indicated by said user using said application interface;
search at least one of: said image data items or said case information based on search parameters; and
return one or more search result image data items, having at least one of image data or attached case information which matches said search parameters, together with any of said case information attached to said search result image data items;
wherein the system is further operable to:
receive information relating to the possible identification of a plurality of suspects;
attach the possible suspect identification information for each suspect to one of more of said image data items, which are indicated by a user using said application interface, so as to create one or more intelligence reports, each of which includes one or more image data items, any case information attached thereto, and possible suspect identification information, as indicated by the user, the system thereby creating a plurality of intelligence reports in response to said possible suspect identification information for said plurality of suspects;

authenticate a user belonging to a distribution approval access group; and update one or more "approved for distribution" intelligence reports that are selected, via said application interface, by said user belonging to said distribution approval access group to indicate that they have been approved for distribution.

4. A computer-implemented crime investigation system according to claim 3, wherein the system is further operable to:

analyse the case information attached to at least one distributed intelligence report belonging to said approved for distribution intelligence reports to determine the location of the suspected offence for each of said at least one distributed intelligence reports;

identify one or more users that are geographically local to the location of the suspected offence for each of said at least one distributed intelligence reports;

notify said one or more geographically local users of the existence of the corresponding one said distributed intelligence reports; and display said corresponding one of the distributed intelligence reports on-screen, when requested by one or more of said geographically local users.

5. A computer-implemented crime investigation system according to claim 4, wherein the system is further operable to: update the case information of said corresponding one of the distributed intelligence reports, in response to commands from said geographically local users via said application interface, to include information relating to whether the possible suspect identification information is correct.

6. A computer-implemented crime investigation system according to claim 3, wherein the system is further operable to, for at least one distributed intelligence report belonging to said approved for distribution intelligence reports, notify one or more users of the system of the existence of the distributed intelligence report in question, said one or more users being determined by the system based at least in part on case information attached to the distributed intelligence report in question.

7. A computer-implemented crime investigation system according to claim 1, wherein said search is carried out automatically upon attachment of case information to an image data item, with said search parameters based on at least one of said case information or said image data item being attached.

8. A computer-implemented crime investigation system according to claim 7, wherein said search parameters are based on said image data item and wherein said search uses facial recognition to match a face visible in said image data item with faces in other image data items stored by said system.

9. A computer-implemented crime investigation system according to claim 1, wherein the system is further operable to receive said search parameters from said user and to carry out said search in response.

10. A computer-implemented crime investigation system according to claim 1, wherein said attached case information includes information relating to the suspected offence and/or information relating to the suspect who is visible within the image.

11. A computer-implemented crime investigation system according to claim 10, wherein said crime information includes at least one of:

information describing the type of the suspected offence;

information relating to the location of the suspected offence;

information indicating the current status of the investigation with regard to the one or more suspects; information relating to the type of device that created the image data item;

information describing one or more possible motivating factors for the suspected offence; and information relating to the type of property that was stolen or damaged during the suspected offence.

12. A computer-implemented crime investigation system according to claim 10, wherein said information relating to the one or more suspects visible within the image includes at least one of:

information describing the hair-style of the one or more suspects;

information describing the clothing, head-wear or foot-wear worn by the one or more suspects; and information describing items carried by the one or more suspects.

13. A computer-implemented crime investigation system according to claim 3, wherein said search is carried out automatically upon attachment of case information to an image data item, with said search parameters based on at least one of said case information or said image data item being attached.

14. A computer-implemented crime investigation system according to claim 13, wherein said search parameters are based on said image data item and wherein said search uses facial recognition to match a face visible in said image data item with faces in other image data items stored by said system.

15. A computer-implemented crime investigation system according to claim 3, wherein the system is further operable to receive said search parameters from said user and to carry out said search in response.

16. A computer-implemented crime investigation system according to claim 3, wherein said attached case information includes information relating to the suspected offence and/or information relating to the suspect who is visible within the image.

17. A computer-implemented crime investigation system according to claim 16, wherein said crime information includes at least one of:

information describing the type of the suspected offence;

information relating to the location of the suspected offence;

information indicating the current status of the investigation with regard to the one or more suspects; information relating to the type of device that created the image data item;

information describing one or more possible motivating factors for the suspected offence; and information relating to the type of property that was stolen or damaged during the suspected offence.

18. A computer-implemented crime investigation system according to claim 16, wherein said information relating to the one or more suspects visible within the image includes at least one of:

information describing the hair-style of the one or more suspects;

information describing the clothing, head-wear or foot-wear worn by the one or more suspects; and information describing items carried by the one or more suspects.

* * * * *